US012415922B2

(12) United States Patent
Sabard et al.

(10) Patent No.: US 12,415,922 B2
(45) Date of Patent: Sep. 16, 2025

(54) COPOLYAMIDE COMPOSITIONS COMPRISING REINFORCING FIBERS AND HAVING HIGH MODULUS STABILITY AND USES THEREOF

(71) Applicant: Arkema France, Colombes (FR)

(72) Inventors: Mathieu Sabard, Serquigny (FR); Benoît Brule, Serquigny (FR); Marie Pommier De Santi, Osaka (JP); Stefania Cassiano Gaspar, Serquigny (FR); Damien Vitry, Kyoto (JP); Rui Mao, Jiangsu (CN)

(73) Assignee: ARKEMA FRANCE, Puteaux (FR)

(*) Notice: Subject to any disclaimer, the term of this patent is extended or adjusted under 35 U.S.C. 154(b) by 625 days.

(21) Appl. No.: 17/439,298

(22) PCT Filed: Mar. 13, 2020

(86) PCT No.: PCT/FR2020/050537
§ 371 (c)(1),
(2) Date: Sep. 14, 2021

(87) PCT Pub. No.: WO2020/188203
PCT Pub. Date: Sep. 24, 2020

(65) Prior Publication Data
US 2022/0153998 A1     May 19, 2022

(30) Foreign Application Priority Data

Mar. 21, 2019    (FR) ..................................... 1902916

(51) Int. Cl.
| | |
|---|---|
| *C08L 77/06* | (2006.01) |
| *C08J 5/04* | (2006.01) |
| *C08L 77/02* | (2006.01) |
| *C08L 77/04* | (2006.01) |

(52) U.S. Cl.
CPC ............. *C08L 77/06* (2013.01); *C08J 5/043* (2013.01); *C08L 77/02* (2013.01); *C08L 77/04* (2013.01); *C08J 2377/02* (2013.01); *C08J 2377/04* (2013.01); *C08J 2377/06* (2013.01); *C08L 2203/20* (2013.01)

(58) Field of Classification Search
CPC ...... C08G 69/26; C08G 69/265; C08G 69/36; C08G 69/08–36; C08J 2377/02–06; C08J 5/0405–08; C08L 77/02–06
See application file for complete search history.

(56) References Cited

U.S. PATENT DOCUMENTS

| 3,843,611 A | 10/1974 | Campbell |
| 2005/0096430 A1 | 5/2005 | Blondel et al. |
| 2011/0195215 A1* | 8/2011 | Briffaud .................. C08L 77/06 |
| | | 428/36.9 |

FOREIGN PATENT DOCUMENTS

| CN | 1675307 A | 9/2005 |
| CN | 102056965 A | 5/2011 |
| CN | 105026153 A | 11/2015 |
| EP | 0471566 A1 | 2/1992 |
| JP | 2012-136620 A | 7/2012 |
| JP | 2012136621 A | 7/2012 |
| KR | 101648993 B1 | 8/2016 |
| WO | 2004015010 A1 | 2/2004 |
| WO | 2010015785 A1 | 2/2010 |
| WO | 2010015786 A1 | 2/2010 |
| WO | 2013054026 A1 | 4/2013 |
| WO | 2014125218 A1 | 8/2014 |
| WO | 2014195226 A1 | 12/2014 |
| WO | 2018073536 A1 | 4/2018 |
| WO | 2018073537 A1 | 4/2018 |

OTHER PUBLICATIONS

International Search Report (PCT/ISA/210) with translation and Written Opinion (PCT/ISA/237) mailed on Aug. 19, 2020, by the European Patent Office as the International Searching Authority for International Application No. PCT/FR2020/050537.
Office Action with English translation, mailed on Nov. 27, 2023, by the Japanese Patent Office for Japanese Application No. 2021-556226, 14 pages.
A Handbook of Fastener Materials, mainly compiled by Longwei Hu, et al., China Aerospace Publishing House, 1st edition, Dec. 2014, p. 465.
Second Office Action with English translation mailed on Mar. 21, 2024, by the China National Intellectual Property Administration for Chinese Application No. (2020800327765), 11 pages.
Office Action with English translation, issued on May 29, 2025, by the Korean Intellectual Property Office in Korean Application No. 10-2021-7033792, 16 pages.

* cited by examiner

*Primary Examiner* — Ana L. Woodward
(74) *Attorney, Agent, or Firm* — Boone IP Law

(57) ABSTRACT

A copolyamide including at least two distinct units A and $X_1Y$ of formula $A/X_1Y$, wherein: A is a repeating unit obtained by polycondensation of: at least one $C_9$ to $C_{18}$ amino acid, or at least one $C_9$ to $C_{18}$ lactam, or at least one $C_4$-$C_{36}$ dicarboxylic acid Cb; $X_1Y$ is a repeating unit obtained from the polycondensation of at least one $C_9$ to $C_{18}$ linear aliphatic diamine ($X_1$), and at least one aromatic dicarboxylic acid (Y), to prepare a composition comprising between 35 and 65% of reinforcing fibers, relative to the total weight of the composition, and for which the flexural modulus or tensile modulus, measured after an identical conditioning, does not vary by more than 20% in the temperature range from 20° C. to 40° C.

18 Claims, No Drawings

COPOLYAMIDE COMPOSITIONS COMPRISING REINFORCING FIBERS AND HAVING HIGH MODULUS STABILITY AND USES THEREOF

TECHNICAL FIELD

The present patent application relates to the use of semi-aromatic copolyamides for the manufacture of compositions having a high modulus stability under the effect of temperature and humidity, the process for their manufacture and the said compositions.

PRIOR ART

Many applications in the E/E field require the use of high modulus polymer materials, for example for televisions, digital cameras, digital games, telephone parts, digital tablets, drones, printers, or computer parts. The modulus of the material is indeed a crucial factor to allow for lower weight, since it enables a reduction in the thickness of the parts while maintaining high rigidity. A distinction is made between different moduli (for example tensile modulus, flexural modulus, etc.). These moduli can be impacted by temperature and by the moisture level in the sample.

It is also important that the stiffness is little affected by changes in temperature or by the water content of the material. Indeed, the stability of the modulus is also an important factor for the subsequent use or to ensure easy assembly of the parts when such assembly is carried out in places where the temperature and/or the humidity can be high.

Thus, polymers are sought whose modulus remains stable over the range of temperatures and/or humidity to which they are exposed, particularly during assembly of the parts and subsequent operation of the devices. Preferably, the modulus would be stable at a temperature of 20° C. to 40° C., in particular in the temperature range of 0° C. to 40° C., in particular in the temperature range of −10° C. to 40° C. for compositions having variable water content (caused by conditioning the compositions in an atmosphere where the hygrometry could vary from 0 to 100%, or in liquid water)

In addition, the polymer formulations must have moderate molding temperatures, and crystallize sufficiently quickly to allow a transformation time, especially a cycle time, suitable for an industrial process.

However, aliphatic polyamides generally experience a significant loss of rigidity when the temperature rises, especially when these polyamides have been conditioned in a humid atmosphere beforehand because they contain a certain amount of water.

It is known from application WO 2018/073536 that a semi-aromatic polyamide, in particular an MXDZ polyamide, is used in a blend of aliphatic polyamide, in particular a semi-crystalline polyamide, comprising glass fibers with a circular cross-section, in order to limit the warping of the resulting composition.

It is also known from international application WO 2018/073537 that circular-section glass fibers are used in a blend comprising at least one MXDZ polyamide and at least one aliphatic polyamide, in particular a semi-crystalline polyamide, to improve the mechanical properties of the said composition, in particular the elongation at break, after it has been processed, in particular by injection or compression molding.

Furthermore, document WO 10/015785 describes copolyamides comprising at least two distinct A/X.T units, characterized in that the said copolyamide has an amine chain end content of greater than or equal to 20 μeq/g, an acid chain end content of less than or equal to 100 μeq/g and a nonreactive chain end content of greater than or equal to 20 μeq/g. The copolyamide may comprise additives, in particular reinforcing fibers, which reinforcing fibers may be glass fibers.

Document WO 10/015786 describes copolyamides comprising at least two A/10.T units, characterized in that it has a polymolecularity index, denoted Ip, of less than or equal to 3.5, measured by gel permeation chromatography.

International application WO 2014/195226 describes compositions for an electronic mobile device comprising at least 20% of at least one polymer and at least 20% of glass fibers having a non-circular cross-section and an elastic modulus of at least 76 GPa determined according to ASTM C1557-03.

None of these prior art documents mention the stability of the modulus as a function of temperature and of the pre-conditioning of the compositions This leaves the problem of providing a polyamide-based formulation that combines a high modulus that is stable over a wide temperature range, even when the composition is saturated with water, with good injection-moldability.

SUMMARY OF THE INVENTION

The purpose of the invention is therefore to provide semi-aromatic copolyamides for the manufacture of compositions with high modulus stability under the effect of temperature and humidity.

Thus, according to a first aspect, the object of the invention is the use of a copolyamide comprising at least two distinct units A and $X_1Y$ of formula $A/X_1Y$, wherein:

A is a repeating unit obtained by polycondensation:
of at least one $C_9$ to $C_{18}$, preferably $C_{10}$ to $C_{18}$, more preferably $C_{10}$ to $C_{12}$, amino acid, or
of at least one $C_9$ to $C_{18}$, preferably $C_{10}$ to $C_{18}$, more preferably $C_{10}$ to $C_{12}$, lactam, or
of at least one $C_4$-$C_{36}$, preferably $C_6$-$C_{18}$, preferably $C_6$-$C_{12}$, more preferably $C_{10}$-$C_{12}$, diamine Ca with at least one $C_4$-$C_{36}$, preferably $C_6$-$C_{18}$, preferably $C_6$-$C_{12}$, more preferably $C_{10}$-$C_{12}$ dicarboxylic acid Cb;

$X_1Y$ is a repeating unit obtained from the polycondensation of at least one linear aliphatic $C_9$ to $C_{18}$, preferably $C_{10}$ to $C_{18}$, more preferably $C_{10}$ to $CC_{12}$ diamine ($X_1$) and at least one aromatic dicarboxylic acid (Y), for preparing a composition whose modulus does not vary by more than 20% in the temperature range from 20° C. to 40° C., in particular in the temperature range from 0° C. to 40° C., especially in the temperature range from −10° C. to 40° C.

In other words, it is an object of the present invention to use a copolyamide comprising at least two distinct units A and $X_1Y$ of formula $A/X_1Y$, as defined hereinbefore, for preparing a composition whose modulus does not vary by more than 20% in the temperature range from 20° C. to 40° C., in particular in the temperature range from 0° C. to 40° C., especially in the temperature range from −10° C. to 40° C., compared with the variation in the modulus of an aliphatic homopolyamide measured under the same conditions.

Or in still other words, it is an object of the present invention to use a copolyamide comprising at least two distinct units A and $X_1Y$ of formula $A/X_1Y$, as defined hereinbefore, for preparing a composition whose modulus does not vary by more than 20% in the temperature range from 20° C. to 40° C., in particular in the temperature range from 0° C. to 40° C., especially in the temperature range from −10° C. to 40° C., compared with the variation in the modulus of an aliphatic homopolyamide having the same unit A, measured under the same conditions.

Or in still other words, it is an object of the present invention to use a composition comprising a copolyamide comprising at least two distinct units A and $X_1Y$ of formula $A/X_1Y$ as defined hereinbefore, to limit the variation in the modulus in the temperature range from 20° C. to 40° C., in particular in the temperature range from 0° C. to 40° C., in particular in the temperature range from −10° C. to 40° C., said modulus not varying by more than 20% compared with the variation in the modulus of said composition measured under the same conditions wherein an aliphatic homopolyamide is used instead of said copolyamide.

Or in still other words, it is an object of the present invention to use a composition comprising a copolyamide comprising at least two distinct units A and $X_1Y$ of formula $A/X_1Y$ as defined hereinbefore, to limit the variation in the modulus in the temperature range from 20° C. to 40° C., in particular in the temperature range from 0° C. to 40° C., in particular in the temperature range from −10° C. to 40° C., said modulus not varying by more than 20% compared with the variation in the modulus of said composition measured under the same conditions wherein an aliphatic homopolyamide having the same unit A, is used instead of said copolyamide.

The inventors unexpectedly found that the selection of a semi-aromatic copolyamide comprising a repeating unit A and a repeating unit $X_1Y$ based on an aromatic diacid makes it possible to prepare a composition whose modulus not only exhibits stability under the effect of temperature and humidity, and does not vary by more than 20% in the temperature range from 20° C. to 40° C., in particular in the temperature range from 0° C. to 40° C., especially in the temperature range from −10° C. to 40° C., but also whose processing is facilitated by a low molding temperature, in particular below 100° C., preferably below 90° C., and by a short cycle time during its processing.

The nomenclature used to define the polyamides is described in ISO standard 1874-1:2011 "Plastiques—Matériaux polyamides (PA) pour moulage et extrusion—Partie 1: Designation", in particular on page 3 (Tables 1 and 2) and is well known to the person skilled in the art.

When the repeating unit A of said copolyamide is obtained from the polycondensation of at least one lactam, said at least one lactam may be selected from a $C_9$ to $C_{18}$ lactam, preferably $C_{10}$ to $C_{18}$, more preferably $C_{10}$ to $C_{12}$. A $C_{10}$ to $C_{12}$ lactam especially is decanolactam, undecanolactam, and lauryllactam.

Said unit A is obtained from the polycondensation of at least one lactam and may therefore comprise a single lactam or a plurality of lactams.

Advantageously, said unit A is obtained from the polycondensation of a single lactam and said lactam is lauryllactam.

When the repeating unit A of said copolyamide is obtained from the polycondensation of at least one amino acid, said at least one amino acid may be selected from a $C_9$ to $C_{18}$ amino acid, preferably $C_{10}$ to $C_{18}$, more preferably $C_{10}$ to $C_{12}$.

An amino acid $C_9$ to $C_{12}$ is especially 9-aminononanoic acid, 10-aminodecanoic acid, 10-aminoundecanoic acid, 12-aminododecanoic acid and 11-aminoundecanoic acid and derivatives thereof, especially N-heptyl-11-aminoundecanoic acid.

Said unit A is obtained from the polycondensation of at least one amino acid and may therefore comprise a single amino acid or several amino acids.

Advantageously, said unit A is obtained from the polycondensation of a single amino acid and said amino acid is 11-aminoundecanoic acid.

When the repeating unit A of said copolyamide is obtained from the polycondensation of at least one $C_4$-$C_{36}$, preferably $C_6$-$C_{18}$, preferably $C_6$-$C_{12}$, more preferably $C_{10}$-$C_{12}$, diamine Ca with at least one $C_4$-$C_{36}$, preferably $C_6$-$C_{18}$, preferably $C_6$-$C_{12}$, more preferably $C_{10}$-$C_{12}$, diacid Cb, then said at least one diamine Ca is a linear or branched, in particular linear, aliphatic diamine and said at least one diacid Cb is a linear or branched aliphatic diacid, in particular a linear diacid.

Advantageously, said at least one diamine is linear aliphatic and said at least one diacid is aliphatic and linear.

Said at least one $C_4$-$C_{36}$ diamine Ca can be in particular selected from 1,4-butanediamine, 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine 1,12-dodecamethylenediamine, 1,13-tridecamethylenediamine, 1,14-tetradecamethylenediamine, 1,16-hexadecamethylenediamine and 1,18-octadecamethylenediamine, octadecenediamine, eicosanediamine, docosanediamine and the diamines obtained from fatty acids.

Advantageously, said at least one diamine Ca is $C_6$-$C_{18}$ and selected from 1,6-hexamethylenediamine, 1,7-heptamethylenediamine, 1,8-octamethylenediamine, 1,9-nonamethylenediamine, 1,10-decamethylenediamine 1,11-undecamethylenediamine, 1,12-dodecamethylenediamine, 1,13-tridecamethylenediamine, 1,14-tetradecamethylenediamine, 1,16-hexadecamethylenediamine and 1,18-octadecamethylenediamine.

Advantageously, said at least one $C_6$ to $C_{12}$ diamine Ca is particularly chosen from 1,6-hexamethylenediamine, 1,7-heptamethylediamine, 1,8-octamethylenediamine, 1,9-nonamethylenediamine, 1,10-decamethylenediamine, 1,11-undecamethylenediamine, and 1,12-dodecamethylenediamine.

Advantageously, the diamine Ca used is a $C_{10}$ to $C_{12}$ diamine, particularly chosen from 1,10-decamethylenediamine, 1,11-undecamethylenediamine, and 1,12-dodecamethylenediamine.

Said at least one $C_4$ to $C_{36}$ dicarboxylic acid Cb may be selected from succinic acid, glutaric acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, octadecenediamine, eicosanediamine, docosanediamine and diamines obtained from fatty acids.

Advantageously, said at least one dicarboxylic acid Cb is $C_6$ to $C_{18}$ and is chosen from adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid.

Advantageously, said at least one dicarboxylic acid Cb is $C_6$ to $C_{12}$ and is chosen from adipic acid, suberic acid, azelaic acid, sebacic acid, undecanedioic acid, and dodecanedioic acid.

Advantageously, said at least one dicarboxylic acid Cb is $C_{10}$ to $C_{12}$ and is chosen from sebacic acid, undecanedioic acid and dodecanedioic acid.

Said unit A is obtained from the polycondensation of at least one diamine Ca with at least one dicarboxylic acid Cb and may therefore comprise a single diamine or a plurality of diamines and a single dicarboxylic acid or several dicarboxylic acids.

Advantageously, said unit A is obtained from the polycondensation of a single diamine Ca with a single dicarboxylic acid Cb.

Said unit $X_1Y$ is a repeating unit obtained from the polycondensation of at least one linear aliphatic $C_9$ to $C_{18}$, preferably $C_{10}$ to $C_{18}$, more preferably $C_{10}$ to $C_{12}$ diamine ($X_1$), and at least one aromatic dicarboxylic acid (Y).

Said linear aliphatic diamine ($X_1$) is as defined for said linear aliphatic diamine Ca.

Said linear aliphatic diamine ($X_1$) may be the same as or different from the linear and aliphatic diamine Ca.

Said aromatic dicarboxylic acid (Y) may be $C_6$ to $C_{18}$, o $C_6$ to $C_{18}$, preferably $C_8$ to $C_{18}$, more preferably $C_8$ to $C_{12}$.

Advantageously, it is chosen from terephthalic acid (T), isophthalic acid (I), or naphthalenedicarboxylic acid (N).

In an advantageous embodiment, said aromatic dicarboxylic acid (Y) is terephthalic acid.

The modulus of a composition varies based on the temperature and typically, the modulus decreases with increasing temperature.

The expression "the modulus does not vary by more than 20% in the temperature range from 20° C. to 40° C." means that in this temperature range from 20° C. to 40° C., the modulus of the same composition, whether it is the flexural modulus or the tensile modulus measured after identical conditioning (dry or wet atmosphere), does not vary by more than 20%.

The term "wet conditioning" means after saturation in liquid water at 65° C.

The same applies, of course, to the other temperature ranges.

In other words, $M_{20}$ being the modulus measured at 20° C. and $M_T$ the modulus measured at a temperature T for a composition conditioned under the same dry or wet atmosphere conditions, then:

$((M_{20}-M_T)/M_{20})\times100 \leq 20$, with T varying from 20 to 40° C.

Advantageously, the modulus does not vary by more than 20% in the temperature range from 0° C. to 40° C. and thus $((M_0-M_T)/M_0)\times100 \leq 20$, with T varying from 0 to 40° C. for a composition conditioned under the same dry or wet atmosphere conditions.

More advantageously, the modulus does not vary by more than 20% in the temperature range from −10° C. to 40° C. and thus $((M_{-10}-M_T)/M_{-10})\times100 \leq 20$, with T varying from −10 to 40° C. for a composition conditioned under the same dry or wet atmosphere conditions.

Advantageously, the modulus does not vary by more than 15% in the temperature range from 0° C. to 40° C. and thus $((M_0-M_T)/M_0)\times100 \leq 15$, with T varying from 0 to 40° C. for a composition conditioned under the same wet atmosphere conditions.

More advantageously, the modulus does not vary by more than 15% in the temperature range from −10° C. to 40° C. and thus $((M_{-10}-M_T)/M_{-10})\times100 \leq 15$, with T varying from −10 to 40° C. for a composition conditioned under the same wet atmosphere conditions.

Advantageously, the modulus does not vary by more than 5% in the temperature range from 0° C. to 40° C. and thus $((M_0-M_T)/M_0)\times100 \leq 5$, with T varying from 0 to 40° C. for a composition conditioned under the same dry atmosphere conditions.

More advantageously, the modulus does not vary by more than 5% in the temperature range from −10° C. to 40° C. and thus $((M_{-10}-M_T)/M_{-10})\times100 \leq 5$, with T varying from −10 to 40° C. for a composition conditioned under the same dry atmosphere conditions.

In one embodiment, the modulus is measured as defined hereinbefore according to ISO 178:2010 and corresponds to the flexural modulus.

In another embodiment, the modulus is measured as defined hereinbefore according to ISO 527-1 and 2:2012 and corresponds to the tensile modulus.

In another embodiment, the modulus corresponds to both the flexural modulus and the tensile modulus, both measured as defined hereinbefore.

Advantageously, the ratio of the flexural modulus, measured at 20° C. on a sample saturated in water at 65° C., to the flexural modulus, measured at 20° C. on a dry sample, is less than 10%, in particular less than 7%, both measurements being carried out according to ISO 178:2010.

In one embodiment, said $X_1Y$ unit of said above-defined copolyamide is a repeating unit obtained by polycondensation of at least one $C_{10}$ to $C_{18}$, more preferably $C_{10}$ to $C_{12}$, aliphatic diamine ($X_1$) and at least one aromatic dicarboxylic acid (Y).

Examples of $X_1Y$ units are 10I, 10T, 10N, 12I, 12T, 12N, 14I, 14T, 14N.

Advantageously, said copolyamide is of formula $A/X_1T$

Advantageously, said $X_1Y$ unit of said copolyamide defined is a repeating unit obtained by polycondensation of at least one $C_{10}$ to $C_{12}$ aliphatic diamine ($X_1$) and at least one aromatic dicarboxylic acid (Y).

Examples of $X_1Y$ units are 10I, 10T, 10N, 12I, 12T, 12N.

Advantageously, $X_1Y$ is selected from 10T, 12T.

Advantageously, said copolyamide is of formula A/10T or A/12T, preferably A/10T

In another embodiment, said unit A of said copolyamide defined hereinbefore is an amino acid or a lactam as defined hereinbefore.

Advantageously, said copolyamide is of formula $A/X_1Y$ wherein A is an amino acid or a lactam as defined hereinbefore and $X_1Y$ is as defined hereinbefore.

Advantageously, said copolyamide is of formula $A/X_1T$ wherein A is an amino acid or a lactam as defined hereinbefore.

Advantageously, said copolyamide is of formula A/10T or A/12T, preferably A/10T wherein A is an amino acid or a lactam as defined hereinbefore.

In another embodiment, said unit A of said copolyamide defined hereinbefore is a $C_{11}$ or $C_{12}$ amino acid or a lactam, respectively.

Advantageously, said copolyamide is of formula $A/X_1Y$ wherein A is a $C_{11}$ or $C_{12}$ amino acid or lactam and $X_1Y$ is as defined hereinbefore.

In yet another embodiment, said copolyamide defined hereinbefore is semi-crystalline.

A semi-crystalline copolyamide, in the sense of the invention, denotes a copolyamide that has a melting temperature (Tm) by DSC according to ISO standard 11357-3:2013, and a crystallization enthalpy during the cooling step at a rate of 20 K/min by DSC measured according to ISO standard 11357-3 of 2013 greater than 30 J/g, preferably greater than 35 J/g.

Advantageously, the Tm of said copolyamide is ≤280° C., in particular ≤270° C., especially ≤265° C.

As a result, in this embodiment, the molar ratio of the A and $X_1Y$ units in the copolyamide of the invention is adapted based on the different units so that said copolyamide is semi-crystalline.

In another embodiment, said copolyamide of formula $A/X_1Y$ consists solely of the A and $X_1Y$ units as defined hereinbefore.

As a result, in this embodiment, the copolyamide has only one or more A unit(s) and only one or more $X_1Y$ unit(s); however, A is a repeating unit obtained from the polycondensation of at least one amino acid or at least one lactam or at least one Ca diamine with at least one Cb dicarboxylic acid as defined hereinbefore, and $X_1Y$ is a repeating unit obtained from the polycondensation of at least one linear aliphatic diamine ($X_1$) as defined hereinbefore, and at least one aromatic dicarboxylic acid (Y) as defined hereinbefore.

In another embodiment, said copolyamide of formula $A/X_1Y$ consists solely of an A unit and an $X_1Y$ unit as defined hereinbefore.

As a result, in this embodiment, the copolyamide has only one A unit and only one $X_1Y$ unit, and A is a repeating unit obtained from the polycondensation of an amino acid or a lactam or a Ca diamine with a Cb dicarboxylic acid as defined hereinbefore, and $X_1Y$ is a repeating unit obtained from the polycondensation of a linear aliphatic diamine ($X_1$) as defined hereinbefore, and an aromatic dicarboxylic acid (Y) as defined hereinbefore.

Advantageously, the copolyamide is chosen from among PA11/10T, PA11/12T, PA12/10T, PA12/12T, PA610/10T, PA610/12T, PA612/10T, PA612/12T, PA1010/10T, PA1012/10T, PA1010/12T, PA1012/12T, PA1210/10T, PA1212/10T, PA1210/12T, PA1212/12T, in particular PA11/10T.

In another embodiment, said copolyamide comprises at least a third Z unit, distinct from the A and $X_1Y$ units, and has the general formulation $A/X_1Y/Z$ wherein:

the A and $X_1T$ units are as defined hereinbefore,

Z is chosen from a unit obtained from an amino acid, a unit obtained from a lactam and a unit having the formula (Cc diamine)·(Cd diacid), with c representing the number of carbon atoms in the diamine and d representing the number of carbon atoms in the diacid, c and d each being inclusively between 4 and 36, and advantageously between 9 and 18, with the proviso that the caprolactam or aminohexanoic acid is excluded from the definition of lactam and amino acid of Z and that when the Cc diamine is a $C_6$ diamine, then terephthalic acid is excluded from the definition of Cd diacid.

It is quite clear that when said copolyamide of formula $A/X_1Y$ consists only of the units A and $X_1Y$ as defined hereinbefore or that said copolyamide of formula $A/X_1Y$ consists only of a unit A and a unit $X_1Y$ as defined hereinbefore, there cannot be a third Z unit.

Nevertheless, in this embodiment where at least one third Z unit distinct from A and $X_1Y$ is present, the copolyamide of the invention may comprise one or more A units and one or more $X_1Y$ units and at least one Z unit.

The term "distinct" means that even if there are several A and/or $X_1Y$ units, the Z unit when present is different from the A and $X_1Y$ units present in the copolyamide, but it may also be of the same type as A, namely a repeating unit obtained from the polycondensation of a lactam, or an amino acid or a Ca diamine with a Cb dicarboxylic acid, or of the same type as $X_1Y$, namely a repeating unit obtained from the polycondensation of at least one linear aliphatic $C_9$ to $C_{18}$ diamine ($X_1$) and at least one aromatic dicarboxylic acid (Y).

When Z represents a unit obtained from an amino acid, it can be chosen from 9-aminononanoic acid, 10-aminodecanoic acid, 10-aminoundecanoic acid, 12-aminododecanoic acid and 11-aminoundecanoic acid and derivatives thereof, in particular N-heptyl-11-aminoundecanoic acid.

When Z represents a unit obtained from a lactam, said lactam can be chosen from pyrrolidinone, 2-piperidinone, caprolactam, enantholactam, caprolactam, pelargolactam, decanolactam, undecanolactam, and lauryllactam.

When the Z unit is a unit having the formula (Cc diamine)·(Cd diacid), the unit (Cc diamine) is chosen from the aliphatic, linear or branched diamines, cycloaliphatic diamines and arylaliphatic diamines.

When the diamine is aliphatic and linear, it is chosen from butanediamine, pentanediamine, hexanediamine, heptanediamine, octanediamine, nonanediamine, decanediamine, undecanediamine, dodecanediamine, tridecanediamine, tetradecanediamine, hexadecanediamine, octadecanediamine, octadecenediamine, eicosanediamine, docosanediamine and diamines obtained from fatty acids.

When the diamine is aliphatic and branched, it may include one or more methyl or ethyl substituents on the main chain. For example, the Cc diamine may advantageously be chosen from 2,2,4-trimethyl-1,6-hexanediamine, 2,4,4-trimethyl-1,6-hexanediamine, 1,3-diaminopentane, 2-methyl-1,5-pentanediamine, 2-methyl-1,8-octanediamine.

When the Cc diamine is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclo-hexyl)propane, bis(3,5-dialkyl-4-aminocyclo-hexyl)butane, bis(3-methyl-4-aminocyclohexyl)methane (BMACM or MACM), p-bis(aminocyclohexyl)-methane (PACM) and isopropylidenedi(cyclohexylamine) (PACP), 1,3-bis(aminomethyl)cyclohexyl (1,3-BAC), 1,4 bis(aminomethyl)cyclohexane (1,4-BAC) and a mixture thereof. It may also comprise the following carbon backbones:norbornylmethane, cyclohexylmethane, dicyclohexylpropane, di(methylcyclohexyl), di(methylcyclohexyl)propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the Cc diamine is arylaliphatic, it is chosen from 1,3-xylylene diamine and 1,4-xylylene diamine.

The Cd dicarboxylic acid is chosen from linear or branched aliphatic diacids, cycloaliphatic diacids and aromatic diacids.

When the Cd diacid is aliphatic and linear, it is chosen from succinic acid, glutaric acid, adipic acid, heptanedioic acid, octanedioic acid, azelaic acid, sebacic acid, undecanedioic acid, dodecanedioic acid, brassylic acid, tetradecanedioic acid, hexadecanedioic acid, octadecanedioic acid, octadecenedioic acid, eicosanedioic acid, docosanedioic acid and fatty acid dimers containing 36 carbons.

The fatty acid dimers mentioned above are dimerized fatty acids obtained by oligomerization or polymerization of monobasic unsaturated long-chain hydrocarbon fatty acids (such as linoleic acid and oleic acid), as described in particular in document EP 0,471,566.

When the diacid is cycloaliphatic, it can comprise the following carbon backbones:norbornylmethane, cyclohexylmethane, dicyclohexylmethane, dicyclohexylpropane, di(methylcyclohexyl), di(methylcyclohexyl)propane.

When the diacid is aromatic, it is chosen from terephthalic acid (denoted T), isophthalic acid (denoted I) and naphthalenic diacids (denoted N).

Caprolactam or aminohexanoic acid are excluded from the definition of lactam and amino acid of Z which means that compounds of formula $6/A/X_1Y$ wherein A and $X_1Y$ are as defined hereinbefore are excluded.

When the Cc diamine is a $C_6$ diamine, then terephthalic acid is excluded from the definition of Cd diacid, meaning that compounds of the formula 6T/A/$X_1$Y wherein A and $X_1$Y are as defined hereinbefore are excluded.

In one embodiment, said copolyamide consists of only three units of formula A/$X_1$Y/Z.

The three units are as defined hereinbefore and the exclusions also apply.

In this embodiment, therefore, there are only the three distinct units A, $X_1$Y and Z, nevertheless one or more A unit(s), one or more $X_1$Y unit(s) and one or more Z unit(s) may be present.

In another embodiment, said copolyamide consists of only three units of formula A/$X_1$Y/Z and only one A unit, one $X_1$Y unit and one Z unit are present in the formula A/$X_1$Y/Z.

In yet another embodiment, the present invention relates to the use of a copolyamide as defined hereinbefore for preparing a composition as defined hereinbefore, said composition comprising up to 70% by weight of reinforcing fibers, in particular from 30 to 70% by weight of reinforcing fibers.

According to one embodiment, the composition comprises between 35 and 65%, and preferably between 50 and 65%, by weight of reinforcing fibers, with respect to the total weight of the composition.

Throughout the description, the phrase "between . . . and" means inclusive.

The composition according to the invention may comprise short reinforcing fibers or short strengthening fibers.

Preferably, the fibers are short and between 2 and 13 mm long, preferably 3 to 8 mm long before the compositions are used.

These short reinforcing fibers may be chosen from:
natural fibers
mineral fibers, those having high melting temperatures Tm' greater than the melting temperature Tm of said semi-crystalline copolyamide of the invention and greater than the polymerization and/or implementation temperature.
polymer fibers having a melting temperature Tm' or if not Tm', a glass transition temperature Tg', greater than the polymerization temperature or greater than the melting temperature Tm of said semi-crystalline copolyamide constituting said matrix of thermoplastic material and greater than the implementation temperature.
or mixtures of the fibers cited above.

Examples of mineral fibers suitable for the invention are carbon fibers, which includes fibers of nanotubes or carbon nanotubes (CNT), carbon nanofibers or graphenes; silica fibers such as glass fibers, in particular type E, R, S2, or T; boron fibers; ceramic fibers, in particular silicon carbide fibers, boron carbide fibers, boron carbonitride fibers, silicon nitride fibers, boron nitride fibers, basalt fibers or basalt-based fibers; fibers or filaments containing metals and/or their alloys; metal oxide fibers, in particular of alumina ($Al_2O_3$); metalized fibers such as metalized glass fibers and metalized carbon fibers or mixtures of above-mentioned fibers.

More particularly, these fibers can be chosen as follows:
the mineral fibers can be chosen from: carbon fibers, carbon nanotube fibers, glass fibers, in particular type E, R, S2, or T, boron fibers, ceramic fibers, in particular silicon carbide fibers, boron carbide fibers, boron carbonitride fibers, silicon nitride fibers, boron nitride fibers, basalt fibers or basalt-based fibers; fibers or filaments containing metals and/or their alloys, fibers containing metal oxides such as $Al_2O_3$, metalized fibers such as metalized glass fibers and metalized carbon fibers or mixtures of above-mentioned fibers, and
the polymer fibers, under the above-mentioned condition, are chosen from:
the thermosetting polymer fibers and more particularly chosen from: unsaturated polyesters, epoxy resins, vinyl esters, phenol resins, polyurethanes, cyanoacrylates and polyimides, such as bismaleimide resins, aminoplasts resulting from the reaction of an amine such as melamine with an aldehyde such as glyoxal or formaldehyde,
fibers of thermoplastic polymers and more particularly chosen from: polyethylene terephthalate (PET), polybutylene terephthalate (PBT),
polyamide fibers,
aramid fibers (such as Kevlar®) and aromatic polyamides such as those having one of the formulas: PPD.T, MPD.I, PAA and PPA, with PPD and MPD being respectively p- and m-phenylene diamine, PAA being polyarylamides and PPA being polyphthalamides,
fibers of polyamide block copolymers such as polyamide/polyether, fibers of polyarylether ketones (PAEK) such as polyetherether ketone (PEEK), polyetherketone ketone (PEKK), polyetherketoneetherketone ketone (PEKEKK).

Preferred short reinforcing fibers are short fibers chosen from: carbon fibers, including metalized fibers, glass fibers, including metalized glass fibers like E, R, S2 or T, aramid fibers (like Kevlar®) or aromatic polyamides, polyarylether ketone (PAEK) fibers, such as polyetherether ketone (PEEK), polyetherketone ketone (PEKK) fibers, polyetherketoneetherketone ketone (PEKEKK) fibers or mixtures thereof.

More particularly, natural fibers are chosen from flax, castor, wood, sisal, kenaf, coconut, hemp and jute fibers.

Advantageously, the ratio by weight of reinforcing fibers to copolyamide does not exceed 1.75, in particular 1.6.

Glass fiber in the sense of the invention are understood to be any glass fiber, in particular that described by Frederick T. Wallenberger, James C. Watson and Hong Li, PPG industries Inc. (ASM Handbook, Vol 21: composites (#06781G), 2001 ASM International).

The reinforcing fiber can be:
either with a circular cross-section with a diameter of between 4 μm and 25 μm, preferably between 4 and 15 μm.
or with a non-circular cross-section having a L/D ratio (where L represents the largest dimension of the cross-section of the fiber and D the smallest dimension of the cross-section of said fiber) between 2 and 8, particularly between 2 and 4. L and D can be measured by scanning electron microscopy (SEM).

Advantageously, the reinforcing fibers are selected from glass fibers, carbon fibers, and a mixture thereof.

Advantageously, the reinforcing fiber is selected from a glass fiber with a non-circular cross-section, a glass fiber with a circular cross-section, a carbon fiber and a mixture thereof.

Advantageously, the reinforcing fiber is selected from a glass fiber with a non-circular cross-section, a glass fiber with a circular cross-section and a mixture thereof.

Advantageously, the reinforcing fiber is a glass fiber with a non-circular cross-section.

Advantageously, the reinforcing fiber is a glass fiber with a non-circular cross-section and an elastic modulus of less than 76 GPa as measured according to ASTM C1557-03.

In one embodiment, said composition is devoid of at least one of the constituents chosen from polyphenylene ether (PPE), an anti-drip agent, a PA46, a PA66, a PA6, a polyamide based on a unit obtained by polycondensation of caprolactam, a free-radical inhibitor, in particular inorganic, a flame retardant, nigrosine, elemental iron, a polyhydric alcohol, a metal oxide selected from magnesium oxide, zinc oxide, calcium oxide or a mixture thereof, an amino acid thermal stabilizer, an amino acid thermal stabilizer with at least one hydroxyl group and an amorphous polyamide.

In one embodiment, if said composition comprises a titanium oxide then it is devoid of a metal oxide selected from magnesium oxide, zinc oxide, calcium oxide or a mixture thereof.

In another embodiment, said composition comprises, in addition to the copolyamide and reinforcing fibers:
  from 0 to 10% by weight of at least one impact modifier;
  from 0 to 20% by weight of at least one filler; and
  from 0 to 5% by weight of at least one fluidifying agent; and
  from 0 to less than 2%, preferably 0.5 to less than 2% by weight of additives, the sum of copolyamide, reinforcing fibers, an impact modifier, filler, fluidifying agent and additives being equal to 100%.

In this latter embodiment, advantageously, said composition is devoid of at least one of the excluded constituents defined hereinbefore.

In one embodiment, the present invention thus relates to the use of a copolyamide comprising at least two distinct units A and $X_1Y$ of the formula $A/X_1Y$ as defined hereinbefore, to prepare a composition comprising:
  from 35 to 70%, in particular 35 to 50, and more particularly 38 to 50% by weight of at least one copolyamide as defined hereinbefore, —from 30 to 70% by weight of reinforcing fibers,
  from 0 to 10% by weight of at least one impact modifier;
  from 0 to 20% by weight of at least one filler; and
  from 0 to 5% by weight of at least one fluidifying agent; and
  from 0 to less than 2%, preferably 0.5 to less than 2% by weight of additives, the sum of copolyamide, reinforcing fibers, impact modifier, filler, fluidifying agent and additives being equal to 100%,
and of which the modulus does not vary by more than 20% in the temperature range from 20° C. to 40° C., in particular in the temperature range from 0° C. to 40° C., especially in the temperature range from −10° C. to 40° C., as defined hereinbefore.

In another embodiment, the present invention thus relates to the use of a copolyamide comprising at least two distinct units A and $X_1Y$ of the formula $A/X_1Y$ as defined hereinbefore, to prepare a composition comprising:
  from 35 to 70%, in particular 35 to 50, and more particularly 38 to 50% by weight of at least one copolyamide as defined hereinbefore,
  between 35 and 65%, and preferably between 50 and 65% by weight of reinforcing fibers,
  from 0 to 10% by weight of at least one impact modifier;
  from 0 to 20% by weight of at least one filler; and
  from 0 to 5% by weight of at least one fluidifying agent; and
  from 0 to less than 2%, preferably 0.5 to less than 2% by weight of additives, the sum of copolyamide, reinforcing fibers, impact modifier, filler, fluidifying agent and additives being equal to 100%, and the modulus of which does not vary by more than 20% in the temperature range from 20° C. to 40° C., in particular in the temperature range from 0° C. to 40° C., especially in the temperature range from −10° C. to 40° C., as defined hereinbefore.

Advantageously, the present invention thus relates to the use of a copolyamide comprising at least two distinct units A and $X_1Y$ of formula $A/X_1Y$ as defined hereinbefore, to prepare a composition comprising:
  from 35 to 70%, in particular 35 to 50, and more particularly 38 to 50% by weight of at least one copolyamide as defined hereinbefore,
  between 35 and 65%, and preferably between 50 and 65% by weight of reinforcing fibers,
  from 0 to 10% by weight of at least one impact modifier;
  from 0 to 20% by weight of at least one filler; and
  from 0 to 5% by weight of at least one fluidifying agent; and
  from 0 to less than 2%, preferably 0.5 to less than 2% by weight of additives, the sum of copolyamide, reinforcing fibers, impact modifier, filler, fluidifying agent and additives being equal to 100%, and the modulus of which does not vary by more than 20% in the temperature range from 20° C. to 40° C., in particular in the temperature range from 0° C. to 40° C., especially in the temperature range from −10° C. to 40° C., as defined hereinbefore.

More advantageously, the present invention thus relates to the use of a copolyamide comprising at least two distinct units A and $X_1Y$ of the formula $A/X_1Y$ as defined hereinbefore, to prepare a composition comprising:
  from 35 to 65%, in particular 35 to 50, and more particularly 38 to 50% by weight of at least one copolyamide as defined hereinbefore,
  between 35 and 65%, and preferably between 50 and 65% by weight of reinforcing fibers, particularly 50 to 62% by weight of reinforcing fibers,
  from 0 to 10% by weight of at least one impact modifier;
  from 0 to 20% by weight of at least one filler; and
  from 0 to 5% by weight of at least one fluidifying agent; and
  from 0 to less than 2%, preferably 0.5 to less than 2% by weight of additives, the sum of copolyamide, reinforcing fibers, impact modifier, filler, fluidifying agent and additives being equal to 100%, and the modulus of which does not vary by more than 20% in the temperature range from 20° C. to 40° C., in particular in the temperature range from 0° C. to 40° C., especially in the temperature range from −10° C. to 40° C., as defined hereinbefore.

In yet another embodiment, said composition consists of the copolyamide, the reinforcing fibers, and:
  from 0 to 10% by weight of at least one impact modifier;
  from 0 to 20% by weight of at least one filler; and
  from 0 to 5% by weight of at least one fluidifying agent; and
  from 0 to less than 2%, preferably 0.5 to less than 2% by weight of additives, the sum of copolyamide, reinforcing fibers, an impact modifier, filler, fluidifying agent and additives being equal to 100%.

In the latter embodiment, said composition therefore does not comprise said above defined and excluded constituents.

Advantageously, in that other embodiment, the present invention thus relates to the use of a copolyamide comprising at least two distinct units A and $X_1Y$ of the formula $A/X_1Y$ as defined hereinbefore, to prepare a composition consisting of:

from 35 to 70%, in particular 35 to 50, and more particularly 38 to 50% by weight of at least one copolyamide as defined hereinbefore, between 30 and 70% by weight of reinforcing fibers, from 0 to 10% by weight of at least one impact modifier;

from 0 to 20% by weight of at least one filler; and from 0 to 5% by weight of at least one fluidifying agent; and from 0 to less than 2%, preferably 0.5 to less than 2% by weight of additives, the sum of copolyamide, reinforcing fibers, impact modifier, filler, fluidifying agent and additives being equal to 100%, and the modulus of which does not vary by more than 20% in the temperature range from 20° C. to 40° C., in particular in the temperature range from 0° C. to 40° C., especially in the temperature range from −10° C. to 40° C., as defined hereinbefore.

Advantageously, in that other embodiment, the present invention thus relates to the use of a copolyamide comprising at least two distinct units A and $X_1Y$ of the formula $A/X_1Y$ as defined hereinbefore, to prepare a composition consisting of:

from 35 to 70%, in particular 35 to 50, and more particularly 38 to 50% by weight of at least one copolyamide as defined hereinbefore, between 35 and 65%, and preferably between 50 and 65% by weight of reinforcing fibers, from 0 to 10% by weight of at least one impact modifier;

from 0 to 20% by weight of at least one filler; and from 0 to 5% by weight of at least one fluidifying agent; and from 0 to less than 2%, preferably 0.5 to less than 2% by weight of additives, the sum of copolyamide, reinforcing fibers, impact modifier, filler, fluidifying agent and additives being equal to 100%, and the modulus of which does not vary by more than 20% in the temperature range from 20° C. to 40° C., in particular in the temperature range from 0° C. to 40° C., especially in the temperature range from −10° C. to 40° C., as defined hereinbefore.

Advantageously, the present invention thus relates to the use of a copolyamide comprising at least two distinct units A and $X_1Y$ of the formula $A/X_1Y$ as defined hereinbefore, to prepare a composition consisting of:

from 35 to 65%, in particular 35 to 50, and more particularly 38 to 50% by weight of at least one copolyamide as defined hereinbefore, between 35 and 65%, and preferably between 50 and 65% by weight of reinforcing fibers, particularly 50 to 62% by weight of reinforcing fibers, from 0 to 10% by weight of at least one impact modifier;

from 0 to 20% by weight of at least one filler; and from 0 to 5% by weight of at least one fluidifying agent; and from 0 to less than 2%, preferably 0.5 to less than 2% by weight of additives, the sum of copolyamide, reinforcing fibers, impact modifier, filler, fluidifying agent and additives being equal to 100%, and the modulus of which does not vary by more than 20% in the temperature range from 20° C. to 40° C., in particular in the temperature range from 0° C. to 40° C., especially in the temperature range from −10° C. to 40° C., as defined hereinbefore.

The expression "impact modifier" means a polyolefin-based polymer having a flexural modulus less than 100 MPa measured according to the standard ISO 178:2010 (23° C. RH50) and Tg less than 0° C. (measured according to the standard 11357-2:2013 at the level of the inflection point of the DSC thermogram), in particular a polyolefin.

The impact modifier may also be a PEBA block polymer (polyether-block-amide) having a flexural modulus <200 MPa.

The composition may further comprise one or more impact modifiers as defined hereinbefore. The presence of an impact modifier makes it possible to confer greater ductility on the articles manufactured.

The polyolefin of the impact modifier may be functionalized or non-functionalized or may comprise both in a mixture.

When the polyolefin is functionalized, some or all of the polyolefins carry a function selected from carboxylic acid, carboxylic anhydride and epoxide functions. The function may in particular be chosen from an ethylene and propylene copolymer with elastomeric character (EPR), an ethylene-propylene-diene copolymer with elastomer character (EPDM) and an ethylene/alkyl (meth)acrylate copolymer, a higher ethylene-alkene copolymer, particularly an ethylene-octene copolymer, an ethylene-alkyl acrylate-maleic anhydride terpolymer.

Peba (polyether block amides) are copolymers containing polyamide and polyether blocks. They may also contain ester functions, in particular resulting from the condensation reaction of terminal carboxylic functions of the polyamide blocks with the hydroxyl functions of the polyether blocks. Peba is commercially available, in particular under the brand name Pebax® by the company Arkema.

Advantageously, the impact modifier is selected from Fusabond F493, Tafmer MH5020, a Pebax®, particularly Pebax® 40R53 SPO1, a Lotader®, Exxelor® VA1803 or VA1801, Orevac® IM800 or a mixture thereof, in which case they are in a ratio ranging from 0.1/99.9 to 99.9/0.1.

The impact modifier can also be a core-shell modifier, also denoted a core-shell polymer. The "core-shell modifier" is presented in the form of fine particles having an elastomer core and at least one thermoplastic shell; the particle size is generally less than a μm and advantageously inclusively between 150 and 500 nm. The core-shell modifier has an acrylic or butadiene base.

Several different impact modifiers may be present in the composition.

According to certain embodiments, the content of impact modifier relative to the total weight of the composition may vary from 0 to 10% by weight, advantageously from 1 to 10% by weight.

According to one embodiment, the composition comprises from 1 to 8%, and in particular from 2 to 5% by weight of impact modifier relative to the total weight of the composition.

In another embodiment, the content of impact modifier in the composition may vary from 1 to 2% by weight; or from 2 to 3% by weight; or from 3 to 4% by weight; or from 4 to 5% by weight; or from 6 to 7% by weight; or from 7 to 8% by weight; or from 8 to 9% by weight; or from 9 to 10% by weight.

With regard to fillers

The composition may also comprise fillers. The fillers envisaged include conventional mineral fillers, such as kaolin, magnesia, slag, carbon black, expanded or unexpanded graphite, wollastonite, nucleating agents such as silica, alumina, clay or talc, in particular talc, pigments such as titanium oxide and zinc sulphide, and antistatic fillers.

The composition may also comprise fluidifying agents.

The term "fluidifying agent" particularly includes prepolymers.

The prepolymer may be selected from linear or branched aliphatic, cycloaliphatic, semi-aromatic or even aromatic polyamide oligomers. The prepolymer can also be a copolyamide oligomer or a mixture of polyamide and copolyamide oligomers. Preferably, the prepolymer has a number average molecular weight Mn from 1000 to 10000 g/mol, in particular from 1000 to 5000 g/mol. In particular, it can be monofunctional $NH_2$ if the chain limiter used is a monoamine for example. The number average molecular weight (Mn) or amine number is calculated according to the following formula: $Mn=1000/[NH_2]$, $[NH_2]$ being the concentration of amine functions in the copolyamide as determined, for example, by potentiometry.

According to certain embodiments, the content of fluidifying agent relative to the total weight of the composition may vary from 0 to 5% by weight, in particular from 1 to 5% by weight, especially from 1 to 5%.

According to one embodiment, the composition comprises from 1 to 4%, and in particular from 2 to 3% by weight of fluidifying agent relative to the total weight of the composition.

According to another embodiment, the content of fluidifying agent relative to the total weight of the composition is from 1 to 2% by weight; or from 2 to 3% by weight; or from 3 to 4% by weight; or from 4 to 5% by weight.

The term "additives" means dyes, stabilizers, surfactants, brighteners, antioxidants, lubricants, plasticizers, waxes and mixtures thereof.

Advantageously, this means dyes, stabilizers, surfactants, brighteners, antioxidants, lubricants, waxes and mixtures thereof.

The stabilizers may be organic or inorganic stabilizers. Typical stabilizers used with polymers are for example phenols, phosphites, UV absorbers, HALS (Hindered Amine Light Stabilizer) type stabilizers and metal iodides. Examples include Irganox® 1010, 245, 1098 from BASF, Irgafos® 168, 126 from BASF, Tinuvin® 312, 770 from BASF, Iodide P201 from Ciba, and Nylostab® S-EED from Clariant.

The lubricants may especially be a stearate or a wax binder.

The waxes can particularly be an amorphous wax, such as beeswax, a silicone wax, a polyethylene wax, an oxidized polyethylene wax, an ethylene copolymer wax, a montan wax and a polyether wax.

Several different additives of the same or different categories may be present in the composition.

The additive content is from 0 to less than 2% by weight relative to the total weight of the composition.

According to one embodiment, the composition comprises from 0.1 to less than 2%, and in particular from 0.5 to less than 2% by weight of additive in relation to the total weight of the composition.

According to some embodiments, the additive content in the composition may vary from 0 to 0.5% by weight; or from 0.1 to 0.5% by weight; or from 0.5 to 1% by weight; or from 1 to 1.5% by weight; or from 1.5 to less than 2% by weight.

According to a second aspect, the invention relates to a composition, in particular useful for injection molding, comprising:
from 35 to 70%, in particular 35 to 50, and more particularly 38 to 50% by weight of at least one copolyamide as defined hereinbefore,
from 30 to 65, in particular 50 to 65, and more particularly 50 to 62% by weight of reinforcing fibers;
from 0 to 10% by weight of at least one impact modifier;
from 0 to 20% by weight of at least one filler; and
from 0 to 5% by weight of at least one fluidifying agent; and
from 0 to less than 2%, preferably 0.1 to less than 2%, in particular 0.5 to less than 2% by weight of additives,
with the proviso that the ratio by weight of reinforcing fibers to copolyamide does not exceed 1.75, in particular 1.6, when the reinforcing fibers are non-circular in cross-section and have a cross-sectional area from 1.5 to $5.0×10^{-6}$ $cm^2$;
the sum of the proportions of each constituent of said composition being equal to 100%.

The exclusion of said non-circular cross-sectional reinforcing fibers having a cross-sectional area from 1.5 to $5.0×10^{-6}$ $cm^2$ is therefore valid for both the 1.75 ratio and the 1.6 ratio.

In one embodiment, said composition particularly useful for injection molding, comprises:
from 35 to 70%, in particular 35 to 50, and more particularly 38 to 50% by weight of at least one copolyamide as defined hereinbefore,
from 30 to 65, in particular 50 to 65, and more particularly 50 to 62% by weight of reinforcing fibers;
from 0 to 10% by weight of at least one impact modifier;
from 0 to 20% by weight of at least one filler; and
from 0 to 5% by weight of at least one fluidifying agent; and
from 0 to less than 2%, preferably 0.1 to less than 2%, in particular 0.5 to less than 2% by weight of additives,
with the proviso that the ratio by weight of reinforcing fibers to copolyamide does not exceed 1.75, in particular 1.6, when the reinforcing fibers have a non-circular cross-section;
the sum of the proportions of each constituent of said composition being equal to 100%.

The exclusion of said non-circular cross-sectional reinforcing fibers is therefore valid for both the 1.75 ratio and the 1.6 ratio.

In another embodiment, said composition particularly useful for injection molding, comprises:
from 35 to 70%, in particular 35 to 50, and more particularly 38 to 50% by weight of at least one copolyamide as defined hereinbefore,
from 30 to 65, in particular 50 to 65, and more particularly 50 to 62% by weight of reinforcing fibers;
from 0 to 10% by weight of at least one impact modifier;
from 0 to 20% by weight of at least one filler; and
from 0 to 5% by weight of at least one fluidifying agent; and
from 0 to less than 2%, preferably 0.1 to less than 2%, in particular 0.5 to less than 2% by weight of additives,
with the proviso that the ratio by weight of reinforcing fibers to copolyamide does not exceed 1.75, in particular 1.6;
the sum of the proportions of each constituent of said composition being equal to 100%.

The reinforcing fibers, impact modifiers, fillers, fluidifying agents and additives are as defined hereinbefore and all the concentration ranges relating to the impact modifiers, fluidifying agents, fillers and additives, defined hereinbefore, are also valid for said composition as such.

The exclusions defined hereinbefore for the preparation of the composition are also valid.

Advantageously, said composition, in particular useful for injection molding, consists of:
from 35 to 70%, in particular 35 to 50, and more particularly 38 to 50% by weight of at least one copolyamide as defined hereinbefore,
from 30 to 65, in particular 50 to 65, and more particularly 50 to 62% by weight of reinforcing fibers;
from 0 to 10% by weight of at least one impact modifier;

from 0 to 20% by weight of at least one filler; and
from 0 to 5% by weight of at least one fluidifying agent; and
from 0 to less than 2%, preferably 0.1 to less than 2%, in particular 0.5 to less than 2% by weight of additives,
with the proviso that the ratio by weight of reinforcing fibers to copolyamide does not exceed 1.75, in particular 1.6, when the reinforcing fibers have a non-circular cross-section and have a cross-sectional area from 1.5 to $5.0 \times 10^{-6}$ cm$^2$;
the sum of the proportions of each constituent of said composition being equal to 100%.

The exclusion of said non-circular cross-sectional reinforcing fibers having a cross-sectional area from 1.5 to $5.0 \times 10^{-6}$ cm$^2$ is therefore valid for both the 1.75 ratio and the 1.6 ratio.

In one embodiment, said composition particularly useful for injection molding, consists of:
from 35 to 70%, in particular 35 to 50, and more particularly 38 to 50% by weight of at least one copolyamide as defined hereinbefore,
from 30 to 65, in particular 50 to 65, and more particularly 50 to 62% by weight of reinforcing fibers;
from 0 to 10% by weight of at least one impact modifier;
from 0 to 20% by weight of at least one filler; and
from 0 to 5% by weight of at least one fluidifying agent; and
from 0 to less than 2%, preferably 0.1 to less than 2%, in particular 0.5 to less than 2% by weight of additives,
with the proviso that the ratio by weight of reinforcing fibers to copolyamide does not exceed 1.75, in particular 1.6, when the reinforcing fibers have a non-circular cross-section;
the sum of the proportions of each constituent of said composition being equal to 100%.

The exclusion of said non-circular cross-sectional reinforcing fibers is therefore valid for both the 1.75 ratio and the 1.6 ratio.

In another embodiment, said composition particularly useful for injection molding, consists of:
from 35 to 70%, in particular 35 to 50, and more particularly 38 to 50% by weight of at least one copolyamide as defined hereinbefore,
from 30 to 65, in particular 50 to 65, and more particularly 50 to 62% by weight of reinforcing fibers;
from 0 to 10% by weight of at least one impact modifier;
from 0 to 20% by weight of at least one filler; and
from 0 to 5% by weight of at least one fluidifying agent; and
from 0 to less than 2%, preferably 0.1 to less than 2%, in particular 0.5 to less than 2% by weight of additives,
with the proviso that the ratio by weight of reinforcing fibers to copolyamide does not exceed 1.75, in particular 1.6;
the sum of the proportions of each constituent of said composition being equal to 100%.

Advantageously, said copolyamide of said composition is chosen from PA11/10T, PA11/12T, PA12/10T, PA12/12T, PA1010/10T, PA1012/10T, PA1010/12T, PA1012/12T, PA1210/10T, PA1212/10T, PA1210/12T, PA1212/12T, in particular PA11/10T.

In one embodiment, the reinforcing fibers of said composition are selected from glass fibers, carbon fibers, and a mixture thereof, in particular glass fibers.

Advantageously, the glass fibers of said composition are selected from glass fibers of a non-circular cross-section and glass fibers of a circular cross-section, carbon fibers, and a mixture thereof, in particular glass fibers of a non-circular cross-section and glass fibers of a circular cross-section and a mixture thereof, in particular glass fibers of a non-circular cross-section.

The glass fibers are as defined hereinbefore.

According to a third aspect, the invention relates to a method for the manufacture of the composition as defined hereinbefore, wherein the constituents of said composition are mixed by compounding, in particular in a twin-screw extruder, preferably a co-rotating extruder, a co-mixer or an internal mixer.

According to a fourth aspect, finally, the invention relates to a molded article obtainable from the composition defined hereinbefore, by injection molding.

Advantageously, said molded article is for electrical applications and electronics, and in particular selected from the group consisting of televisions, digital cameras, digital games, telephone parts, digital tablets, drones, printers, or computer parts.

EXAMPLES

The invention will be explained in more detail in the following examples.

Example 1: Synthesis of the Copolyamides of the Invention

The various polyamides (comparison) and copolyamides of the invention were prepared according to the usual techniques for polyamide and copolyamide synthesis.

Synthesis of CoPa 11/10T representative of the various copolyamides:

the aminoundecanoic, decanediamine and terephthalic acid monomers are loaded together in the reactor according to the desired mass ratio. The medium is first inerted to remove the oxygen that can generate yellowing or secondary reactions. Water can also be charged to improve heat exchange. Two temperature rise and pressure plateaus are conducted. The temperature (T°) and pressure conditions are chosen to allow the medium to melt. After having reached the maintenance conditions, degassing takes place to allow the polycondensation reaction. The medium becomes viscous little by little and the reaction water formed is caused the nitrogen purge or applying a vacuum. When the stoppage conditions are reached, related to the desired viscosity, stirring is stopped and the extrusion and granulation can start. The granules obtained will then be compounded with the fiberglass.

Compounding

The compositions were prepared by mixing the polymer granules with short fibers when melted. This mixture was made by compounding on a twin-screw co-rotating MC26 type extruder with a flat temperature profile (T°) at 290° C. The screw rate is 250 rpm and the flow rate is 20 kg/h.

The introduction of the glass fibers is achieved by side feeding.

Additives and fillers are added during the compounding process in the main hopper.

The following compositions were prepared (E=Example of the invention CE=Comparative example):

TABLE 1

| Composition | E1 | E2 | E3 | E4 | E5 | E6 | E7 | E8 | CE1 | CE2 |
|---|---|---|---|---|---|---|---|---|---|---|
| 11/10T (28/72 by weight) | 48.40 | 38.46 | 48.40 | 38.46 | 38.46 | | | | | |
| PA1010 | | | | | | | | | | 39.46 |
| PA1010/10T (28/72 by weight) | | | | | | 38.46 | | | | |
| PA12/10T (28/72 by weight) | | | | | | | 38.46 | | | |
| PA11/12T (28/72 by weight) | | | | | | | | 38.46 | | |
| PA11 | | | | | | | | | 39.46 | |
| Prepolymer PA11 monoNH2 | | | | | 5.00 | | | | | |
| Irganox® 245 | 0.1 | 0.08 | 0.1 | 0.08 | 0.08 | 0.08 | 0.08 | 0.08 | 0.08 | 0.08 |
| Irgafos® 168 | 0.2 | 0.16 | 0.2 | 0.16 | 0.16 | 0.16 | 0.16 | 0.16 | 0.16 | 0.16 |
| Calcium stearate | 0.30 | 0.30 | 0.30 | 0.30 | 0.30 | 0.30 | 0.30 | 0.30 | 0.30 | 0.30 |
| Talc Steamic OOS DG | 1.00 | 1.00 | 1.00 | 1.00 | 1.00 | 1.00 | 1.00 | 1.00 | | |
| Fiber with circular cross-section CSX 451J | 50.00 | 60.00 | | | 55.00 | | | | 60.00 | 60.00 |
| Fiber with non-circular cross-section CSG 3PA-820 | | | 50 | 60.00 | | 60.00 | 60.00 | 60.00 | | |

Irganox® 245 and Irgafos® 168 are anti-oxidants
CSX 451J circular cross-section fiber and CSG 3PA820 non-circular cross-section fiber (also known as flat fiber) are marketed by the company Nittobo Injection
100*100*1 mm³ plates were prepared by injecting the different compositions:
Injection temperature: 300° C.
Mold temperature: 80° C.
The cycle time is adjusted according to the compositions to allow injection of the compositions and is less than 50 seconds.

Example 2: Variation in Flexural Modulus after Water Sorption

In order to evaluate the impact of moisture on the flexural modulus, the flexural modulus of specimens of the compositions obtained was measured on an Instron 5966 machine manufactured by the Instron company. The compositions are dried compositions and compositions saturated in water at 65° C. beforehand.
The tests were carried out at different temperatures, from −10° C. to 60° C.
In the injection-molded plates, specimens with dimensions according to ISO 178 but with a thickness of 1 mm were cut out in the direction of injection.
The results are shown in Tables 2 to 8 below:

TABLE 2

PA11 + 60% glass fiber circular section = CE1

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 1 | 3 | |
| 20 | 3 | 16 | 13 |
| 40 | 12 | 31 | |
| 60 | 27 | 38 | |

TABLE 3

PA1010 + 60% circular glass fiber = CE2

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 1 | 3 | |
| 20 | 2 | 15 | 18 |
| 40 | 9 | 30 | |
| 60 | 22 | 39 | |

TABLE 4

PA11/10T (28/72 by weight) + 50% glass fiber circular section = E

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 0 | 0 | |
| 20 | 0 | 1 | 1 |
| 40 | 1 | 10 | |
| 60 | 3 | 25 | |

TABLE 5

PA11/10T (28/72 by weight) + 60% glass fiber circular section = E2

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 0 | 1 | |
| 20 | 1 | 4 | 1 |
| 40 | 1 | 12 | |
| 60 | 3 | 29 | |

TABLE 6

PA11/10T (28/72 by weight) + 50% glass fiber
non-circular section (flat fiber) = E3

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 1 | 0 | |
| 20 | 1 | 2 | 2 |
| 40 | 1 | 9 | |
| 60 | 3 | 23 | |

TABLE 7

PA11/10T (28/72 by weight) + 60% glass fiber
non-circular section (flat fiber) = E4

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 1 | 1 | |
| 20 | 2 | 4 | 1 |
| 40 | 3 | 13 | |
| 60 | 5 | 28 | |

TABLE 8

PA11/10T (28/72 by weight) + 5% prepoPA11 +
55% glass fiber circular section = E5

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 0 | 1 | |
| 20 | 1 | 5 | −1 |
| 40 | 2 | 16 | |
| 60 | 7 | 31 | |

TABLE 9

PA1010/10T (28/72 by weight) + 60% glass fiber
non-circular section (flat fiber) = E6

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 1 | 0 | |
| 20 | 1 | 3 | 1 |
| 40 | 3 | 12 | |
| 60 | 4 | 26 | |

TABLE 10

PA12/10T (28/72 by weight) + 60% glass fiber
non-circular section (flat fiber) = E7

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 1 | 1 | |
| 20 | 3 | 4 | 2 |
| 40 | 3 | 14 | |
| 60 | 5 | 26 | |

TABLE 11

PA11/12T (28/72 by weight) + 60% glass fiber
non-circular section (flat fiber) = E8

| | modulus loss in dry state (%) $(M_{-10} - M_T/M_{-10}) \times 100$ | modulus loss in saturated state (%) $(M_{-10} - M_T/M_{-10}) \times 100$ | modulus ratio at 20° C. between saturated and dry state (%) $M_{20\ saturated}/M_{20\ dry}$ |
|---|---|---|---|
| −10 | 0 | 0 | |
| 0 | 1 | 2 | |
| 20 | 2 | 5 | 2 |
| 40 | 4 | 14 | |
| 60 | 5 | 28 | |

Example 3: Variation in Tensile Modulus after Water Sorption

In order to evaluate the impact of moisture on the tensile modulus, the tensile modulus of specimens of the compositions obtained on an Instron 5966 machine manufactured by the Instron company was measured, dry compositions and compositions saturated in water at 65° C. beforehand.

The tests were carried out at different temperatures, from −10° C. to 60° C.

In the injection-molded plates, specimens with dimensions according to ISO 527 but with a thickness of 1 mm were cut out in the direction of injection.

The same trends as those observed for flexural modulus are found for tensile modulus.

Tables 2 to 8 and Example 3 show that the compositions of the invention have a higher modulus stability than the comparison compositions CE1 and CE2 for both flexural and tensile.

The invention claimed is:
1. A method of forming a composition comprising a copolyamide and reinforcing fibers, the method comprising mixing
   the copolyamide comprising at least two distinct units A and $X_1Y$ of the formula $A/X_1Y$, wherein:
   A is a repeating unit obtained by polycondensation:
     of at least one $C_9$ to $C_{18}$ amino acid, or
     of at least one $C_9$ to $C_{18}$ lactam, or
     of at least one $C_4$-$C_{36}$ diamine Ca with at least one $C_4$-$C_{36}$ dicarboxylic acid Cb;
     said at least one diamine Ca being a linear or branched aliphatic diamine, and said at least one Cb diacid being a linear or branched aliphatic diacid,
   $X_1Y$ is a repeating unit obtained from the polycondensation of at least one $C_9$ to $C_{18}$ linear aliphatic diamine ($X_1$) and at least one aromatic dicarboxylic acid (Y), and the reinforcing fibers, the composition comprising between 35 and 65% by weight of the reinforcing fibers, relative to the total weight of the composition, wherein the flexural modulus or tensile modulus of the composition, measured after identical conditioning, does not vary by more than 20% in the temperature range from 20° C. to 40° C., wherein the composition further comprises a fluidifying agent, wherein the fluidifying agent includes an amide prepolymer, wherein the amide prepolymer is obtained from a monoamine chain limiter, wherein the content of fluidifying agent relative to the total weight of the composition is from 1 to 5% by weight.

2. The method according to claim 1, wherein $X_1Y$ is a repeating unit obtained by polycondensation of at least one $C_{10}$ to $C_{18}$ aliphatic diamine (X), and at least one aromatic dicarboxylic acid (Y).

3. The method according to claim 1, wherein Y is terephthalic acid.

4. The method according to claim 1, wherein $X_1Y$ is a unit selected from units 10T and 12T.

5. The method according to claim 1, where in the copolyamide with the formula $A/X_1Y$, A is an amino acid or a lactam.

6. The method according to claim 1, wherein in the copolyamide with the formula $A/X_1Y$, A is a $C_{11}$ or $C_{12}$ amino acid or lactam.

7. The method according to claim 1, wherein said copolyamide is semi-crystalline.

8. The method according to claim 1, wherein said copolyamide consists solely of the units A and $X_1Y$ of formula $A/X_1Y$.

9. The method according to claim 1, wherein said copolyamide comprises at least one third unit Z, distinct from the A and $X_1Y$ units, and corresponds to the general formulation $A/X_1Y/Z$ wherein:

Z is chosen from a unit obtained from an amino acid, a unit obtained from a lactam and a unit having the formula (Cc diamine). (Cd diacid), with c representing the number of carbon atoms in the diamine and d representing the number of carbon atoms in the diacid, c and d each being between 4 and 36, with the proviso that caprolactam or aminohexanoic acid are excluded from the definition of the lactam and the amino acid of Z and that when the Cc diamine is a C6 diamine, then terephthalic acid is excluded from the definition of the Cd diacid.

10. The method according to claim 9, wherein said copolyamide consists only of three units of the formula $A/X_1Y/Z$.

11. The method according to claim 10, wherein the reinforcing fibers are selected from a group consisting of glass fibers, carbon fibers, and a mixture thereof.

12. A composition configured for injection molding, the composition comprising:

from 35 to 70% by weight of at least one copolyamide, between 35 and 65% by weight of reinforcing fibers;

from 0 to 10% by weight of at least one impact modifier;

from 0 to 20% by weight of at least one filler; and from 1 to 5% by weight of at least one fluidifying agent; and from 0 to less than 2% by weight of additives, with the proviso that the ratio by weight of reinforcing fibers to copolyamide does not exceed 1.75 when the reinforcing fibers are non-circular in cross-section and have a cross-sectional area from 1.5 to $5.0 \times 10^{-6}$ cm$^2$;

the sum of the proportions of each constituent of said composition being equal to 100%; and the copolyamide comprising at least two distinct units A and $X_1Y$ of the formula $A/X_1Y$, wherein:

A is a repeating unit obtained by polycondensation:

of at least one $C_9$ to $C_{18}$ amino acid, or of at least one $C_9$ to $C_{18}$ lactam, or of at least one $C_4$-$C_{36}$ diamine Ca with at least one $C_4$-$C_{36}$ dicarboxylic acid Cb;

said at least one diamine Ca being a linear or branched aliphatic diamine, and said at least one Cb diacid being a linear or branched aliphatic diacid, $X_1Y$ is a repeating unit obtained from the polycondensation of at least one $C_9$ to $C_{18}$ linear aliphatic diamine ($X_1$) and at least one aromatic dicarboxylic acid (Y), wherein the flexural modulus or tensile modulus of the composition, measured after identical conditioning, does not vary by more than 20% in the temperature range from 20° C. to 40°° C., wherein the fluidifying agent includes an amide prepolymer, wherein the amide prepolymer is obtained from a monoamine chain limiter.

13. The composition according to claim 12, wherein the copolyamide is selected from PA11/10T, PA11/12T, PA12/10T, PA12/12T, PA1010/10T, PA1012/10T, PA1010/12T, PA1012/12T, PA1210/10T, PA1212/10T, PA1210/12T, or PA1212/12T.

14. The composition according to claim 12, wherein the reinforcing fibers are selected from a group consisting of glass fibers, carbon fibers, and a mixture thereof.

15. The composition according to claim 14, wherein the glass fibers are selected from a group consisting of glass fibers of a non-circular cross-section, glass fibers of a circular cross-section, and a mixture thereof.

16. A method of manufacturing the composition as defined in claim 12, wherein the constituents of the said composition are mixed by compounding.

17. A molded article obtainable from the composition according to claim 12, by injection molding.

18. The molded article according to claim 17, wherein the molded article is configured for electrical applications and electronic applications.

* * * * *